Patented Nov. 2, 1926.

1,605,851

UNITED STATES PATENT OFFICE.

REGINALD HILL MONK, OF MONTREAL, QUEBEC, CANADA, ASSIGNOR OF ONE-HALF TO JOHN IRWIN, OF MONTREAL, CANADA.

PROCESS OF PRODUCING A TITANIUM PIGMENT.

No Drawing.    Application filed March 21, 1925. Serial No. 17,378.

This invention relates to pigments and particularly to those containing titanium oxide.

The object of my invention is to provide an improved pigment as well as the process of treatment to obtain the same.

A further object is to prevent the formation of the higher oxides of titanium in the process of calcination of titanium hydroxide.

The invention consists briefly in the employment of carbonaceous material in the calcination of the titanium oxide compounds, and cooling the calcined product.

I am aware that it has been proposed to use phosphoric acid or phosphates in the dehydration of titanium oxide in order to prevent the discoloration of the product. The result of such an addition is not satisfactory as certain deleterious compounds are formed in the product and some of these are soluble, and give to the pigment undesirable properties.

When a carbonaceous material is used in the calcination, no undesirable substance is found in the final product as the added material disappears in the treatment and the result is a pure product of full strength containing only titanium oxide and any desirable entender that may have been previously added.

The carbonaceous material may be added in either solid or fluid form.

Among the materials that may be used are: charcoal, starch, flour, sugar, sawdust and cellulose or oils.

The amount of the added material may vary and good results have been obtained with a proportion of from 2% to 20% of the total weight of the precipitate being treated.

In order to illustrate the manner in which the process is carried out the following example is given:—

With a precipitate of titanium hydroxide obtained by hydrolysis and from which iron has been removed by well known methods, but which may contain a filler such as barium sulphate, and after thorough washing, 8% of finely ground sawdust is added and well mixed.

The mixture is dried and then fed into a calcining furnace and heated to a temperature sufficient to completely dehydrate the titanium oxide, between 750° C. and 900° C.

After the calcination of the titanium oxide is complete and the carbonaceous material has been consumed, the product is cooled.

This product is of a pure white color and contains a minimum of impurities.

It can then be ground and mixed with the usual paint or enamel ingredients.

The purity of the $TiO_2$ produced by this process gives it qualities of peculiar excellence when used as a pigment.

What I claim is:—

1. The process of producing a titanium pigment, comprising mixing a compound essentially of precipitated titanic oxide with a carbonaceous material and calcining the mixture.

2. The process of producing a titanium pigment, comprising mixing precipitated titanium hydroxide with a carbonaceous material and calcining the mixture.

3. The process of producing a titanium pigment, comprising mixing precipitated titanium hydroxide with a carbonaceous material and calcining the mixture at a temperature between 750° C. and 900° C.

4. The process of producing a titanium pigment, comprising mixing precipitated titanium hydroxide with a carbonaceous material and calcining the mixture and cooling the product.

5. The process of producing a titanium pigment, comprising mixing precipitated titanium hydroxide with a carbonaceous material and calcining the mixture which is then pulverized.

6. The process of producing a titanium pigment, comprising mixing precipitated titanium hydroxide with from 2% to 20% by weight of a pulverized carbonaceous material and calcining the mixture.

7. The process of producing a titanium pigment, comprising mixing a precipitated titanium hydroxide with a miscible form of carbonaceous material and calcining the mixture.

8. The process of producing a titanium pigment, comprising mixing comminuted precipitated titanium hydroxide with a pulverized carbonaceous material and calcining the mixture and cooling the product.

9. The process of producing a titanium pigment, comprising mixing precipitated titanium hydroxide with a carbonaceous material, calcining the mixture, at a temperature between 750° C. and 900° C. and cooling the product.

10. The process of producing a titanium pigment, comprising mixing precipitated titanium hydroxide with a carbonaceous material, calcining the mixture at a temperature below the point of fusion and cooling the product.

11. The process of producing a pure white pigment, comprising mixing precipitated titanium hydroxide with a carbonaceous material, calcining the mixture and comminuting the product.

12. The process of producing dehydrated $TiO_2$ free from the higher oxides of titanium, comprising mixing precipitated titanium hydroxide with from 2% to 20% of pulverized carbonaceous material and calcining the mixture at a temperature of between 750° C. and 900° C. and cooling the product.

REGINALD HILL MONK.